United States Patent [19]

Schmider

[11] 4,125,792
[45] Nov. 14, 1978

[54] BRUSHLESS D-C MOTOR

[75] Inventor: Fritz Schmider, Hornberg, Fed. Rep. of Germany

[73] Assignee: Papst Motoren KG, St. Georgen, Fed. Rep. of Germany

[21] Appl. No.: 576,650

[22] Filed: May 12, 1975

[30] Foreign Application Priority Data

May 18, 1974 [DE] Fed. Rep. of Germany ....... 2424290

[51] Int. Cl.² .................. H02K 3/04; H02K 29/02
[52] U.S. Cl. ............................ 310/268; 310/156; 318/254
[58] Field of Search .............. 318/138, 254, 314; 310/156, 68, 268

[56] References Cited

U.S. PATENT DOCUMENTS

| 2,847,589 | 8/1958 | Haydon | 310/268 X |
| 3,096,455 | 2/1963 | Hahn | 310/268 |
| 3,118,076 | 1/1964 | Held | 310/268 X |
| 3,569,753 | 3/1971 | Babikyan | 310/268 X |
| 3,579,277 | 5/1971 | Imahashi | 310/156 |
| 3,766,458 | 10/1973 | Nishimura et al. | 318/314 X |
| 3,867,656 | 2/1975 | Mitsui et al. | 310/156 X |

FOREIGN PATENT DOCUMENTS

| 269,277 | 3/1969 | Australia. |
| 1,907,822 | 2/1969 | Fed. Rep. of Germany. |
| 1,138,156 | 12/1968 | United Kingdom. |
| 1,218,897 | 1/1971 | United Kingdom. |
| 1,237,776 | 6/1971 | United Kingdom. |
| 1,240,604 | 7/1971 | United Kingdom. |
| 1,262,980 | 2/1972 | United Kingdom. |
| 1,323,342 | 7/1973 | United Kingdom. |

OTHER PUBLICATIONS

German Printed Appl. 1,538,749, 12/66.
German Printed Appl. 2,143,752, 9/71.
German Printed Appl. 2,240,717, 8/72.
German Printed Appl. 2,423,665, 5/74.

Primary Examiner—Robert J. Hickey
Attorney, Agent, or Firm—Flynn & Frishauf

[57] ABSTRACT

A preferably axial air gap motor has coreless armature stator windings and a permanent magnet rotor. Sensors, such as Hall generators, are provided to sense the rotary position of the rotor and control switching of current to the respective armature windings. The stator armature windings have a maximum of two magnetically active coil sections per pole of the multi-polar rotor, preferably arranged as flat round coils located on the stator in diametrically arranged configuration, the angular spacing between imaginary diametrical lines through the coils being, however, non-uniform over the rotor circumference, and matched to the spacing of rotor poles, the larger angular gaps between the coils providing space on the stator for the sensors and electronic circuitry. In a preferred embodiment, the rotor has numbers of poles divisible by eight.

52 Claims, 17 Drawing Figures

BRUSHLESS D-C MOTOR

Cross reference to related patent and application:
U.S. Pat. No. 3,845,339; U.S. Ser. No. 402,259, now U.S. Pat. No. 3,924,166, Doeman, both assigned to the assignee of the present application.

The invention relates to brushless d-c motors with a coreless stator winding and a multipolar permanent magnet rotor which, in operation, interacts with a rotary field produced by the coreless stator winding, controlled by the rotary position of the rotor by means of a sensor arrangement.

A motor of this type is known from U.S. Pat. No. 3,845,339, assigned to the assignee of this application. This motor may be used as a slow speed motor for direct drive of record players at 33⅓ or 45 r.p.m.; for such use it is preferably constructed as an 8-pole motor. Its coreless (i.e. air-core) stator winding is a two-layer winding, wherein two layers of 8 series-connected bifilar windings are used; per rotor pole 4 magnetically active coil sections are used.

This motor has excellent running characteristics and the described arrangement with 16 coils has the special advantage of permitting the use of the control system invention described in U.S. Ser. No. 402,259, now U.S. Pat. No. 3,924,166, Doeman, assigned to the assignee of this application, which makes the use of a tacho-alternator unnecessary.

It is an object of the invention to improve this known motor without any loss of its qualities.

Subject matter of the present invention: A motor, generally of the type described in U.S. Pat. No. 3,845,339, and preferably a flat or axial air gap motor has, preferably, a 4-phase stator winding with a maximum of two magnetically active coil sections per pole of the multipolar rotor.

If individual coils are used, as in the motor of U.S. Pat. No. 3,845,339, the number of coils in such a motor can be halved; in that case, for comparable power output, larger coils are required whose coil width is approximately twice as large as that of the hitherto used coils. These larger coils can be manufactured and assembled more easily, so that a cheaper motor is obtained. Furthermore, larger free sections are obtained between the magnetically active coil sections which can be utilized for the positioning of switching members, e.g. of sensors in the manner of Hall generators. The motor according to U.S. Pat. No. 3,845,339 uses narrow webs to separate the individual, trapezoidally wound coils causing a not inconsiderable pitch factor; the wider, magnetically active coil sections according to the invention have no such web so that the pitch factor is improved. Thus, there is only a small loss of powder with the same size of motor as compared with one having twice the number of coils. The larger number of smaller coils, given a predetermined motor size, results in a better copper factor; the somewhat smaller copper factor obtained with an arrangement according to the invention is, however, compensated by the better pitch factor.

According to a feature of the invention, the motor can advantageously be so constructed that round coils are used and the motor is a flat motor. Round coils are much easier to manufacture than trapezoidal coils and lead to only a slight power loss as compared with trapezoidal coils.

In the case of motors with a number of poles which is integrally divisible by at least 4 and preferably 8, a particularly simple construction is obtained in that in place of each set of $n$ unidirectional coils being displaced relative to one another by 360° electrical, or a multiple thereof, there is provided a single coil having approximately $n$ times the number of ampere turns of the particular set of individual coils and said single coils are arranged in non-overlapping fashion to obtain a single layer winding. Such a construction is particularly suitable for 8-, 16- or 24-pole motors where, as a result of the invention, a particularly simple winding arrangement is obtained which leaves plenty of space on the stator for the arrangement of electrical components, e.g. Hall generators or other sensors, resistors, transistors or other compounds. This provides a further simplification in that, e.g. the signals from the sensors for the rotor rotation position can be partly processed on the stator itself, so that as compared with the known motor, the number of supply lines is reduced which further simplifies assembly.

The invention will be described by way of example with reference to the accompanying drawings, wherein.

Figure 1:
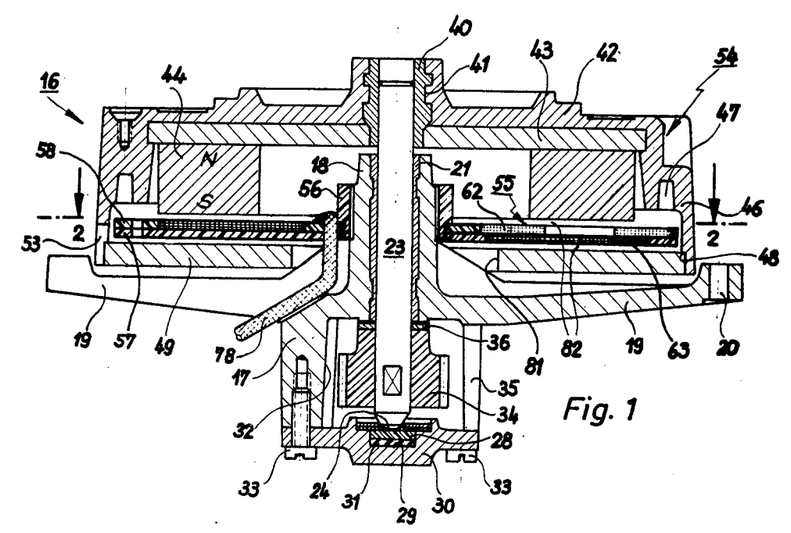
FIG. 1 is a longitudinal section through a first embodiment of a brushless d-c motor according to the invention along the line 1—1 of FIG. 2.

FIG. 1 shows a first embodiment of a brushless d-c motor according to the invention designed by the overall reference numeral 16. It has a stationary hollow molding 17 with a bearing supporting tube 18 and lateral supporting arms 19, said arms having holes 20 on their ends for attachment to an apparatus, e.g. the chassis of a record player.

In the bearing supporting tube 18 is cast a sintered bushing 21. Bushing 21 journals a shaft 23 whose lower end is provided with a rounded tip 24 placed on a plastic plate 28 serving as an axial or thrust bearing. The plastic plate 28 is fitted in a recess 29 of a cover 30 and located on a rubber plate 31.

The cover 30 serves as a lower termination of a recess 32 of molding 17. It is secured to molding 17 by screws 33. A gear wheel 34 made of plastic or constructed as a metal die casting is fixed to shaft 23 inside recess 32; the gear wheel 34 can mesh through a lateral opening 35 of recess 32 with another gear wheel (not shown), e.g. in the case of a record player with the mechanism for a record changer or the pick-up arm. A disk 36 which serves as an axial auxiliary bearing is arranged between the top of gear wheel 34 and the bottom of the bearing supporting tube 18. A steel bushing 40 is pressed on the upper end of shaft 23. Bushing 40 has slot-shaped depressions 41 on its periphery. An approximately bell-shaped aluminum casting 42 is anchored in depressions 41. A soft iron plate 43 is cast into aluminum casting 42. It fulfills two functions: (1) serving as a magnetic return path and (2) keeping the penetration of a stray field emanating from the motor directed towards the top of plate 43 as small as possible in order to avoid hum in case the motor is used in a record player with a magnetic sound pick-up system.

A magnet ring 44 made of ceramic magnetic material whose privileged direction is in the axial direction is adhered to plate 43. This magnet ring is axially alternately oppositely polarized, i.e. for example North-South, South-North, North-South, etc. In FIG. 1 this is schematically indicated by the letters N-S. The annular magnet shown has eight such differently directed magnets which are uniformly distributed about the said ring. Magnet ring 44 preferably is itself solid and in one piece, but it is also possible to use individual magnets.

The magnet ring 44 is secured to plate 43 by a magnetizable adhesive layer which remains plastic until cured. The downwardly projecting rim 46 of casting 42 has bores 47 used for balancing purposes. Furthermore, at the bottom of rim 46, a shoulder 48 is provided against which abuts a soft iron magnetic return plate 49 which is drawn upwardly by the force of magnet ring 44. In the motor 16 shown approximately in a scale of 1:1 on the original of the annexed drawings, this force is about 3.5 kg-force. To secure the return plate 49 during assembly, a plurality of lateral assembly holes 53 are provided in edge 46 so that the plate 49 can be gently mounted on shoulder 48 and can, if necessary, be removed for repair purposes. In operation, plate 49 rotates with the rotor, indicated by overall reference numeral 54, because it is supported on shoulder 48 and is in frictional engagement therewith. Thus, the force of magnet ring 44 does not act on axial bearing 24, 28 which only has to carry the weight of rotor 54, plate 49 and optionally additional parts which are mounted on rotor 54, for example, of a turntable.

The stator, given the overall reference numeral 55, has an inner bushing 56 which is pressed onto the outside of the bearing supporting tube 18. It can also, however, be adhered to the bearing supporting tube 18, or an attachment in accordance with FIG. 6 can be used.

Figure 2:
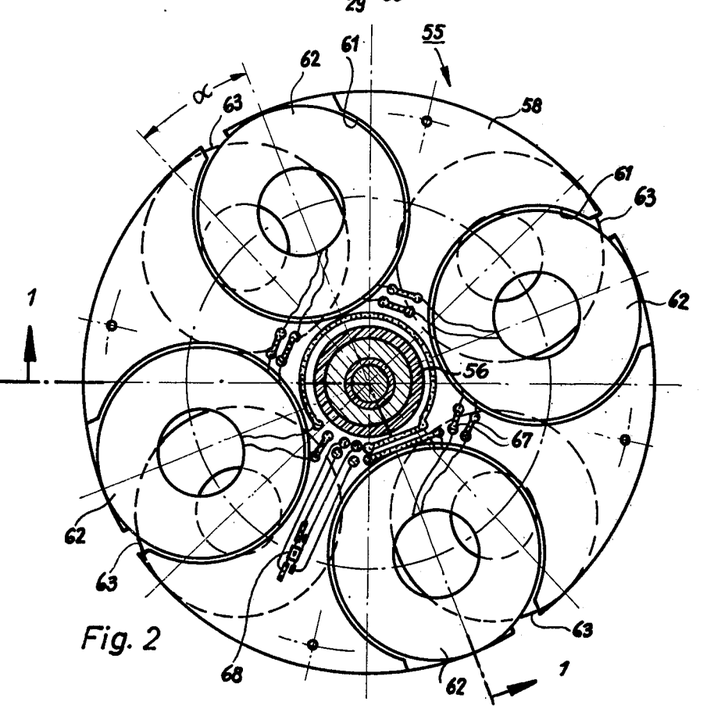
FIG. 2 is a section along the line 2—2 of FIG. 1.

FIG. 2 shows a plan view of stator 55 prior to assembly. As shown, it substantially comprises two superimposed pressboard panels 57 and 58 which in each case are provided with four recesses 61 in each case displaced by 90° mechanical relative to one another for receiving corresponding round coils 62 (upper layer) or 63 (lower layer). The upper and lower coils are in each case displaced by 90° el. relative to one another, so that the magnetically active coil sections 64 of the upper layer and 65 of the lower layer (FIG. 9) alternate with one another with the same angular spacings.

Both stator plates 57 and 58 are fixed to the central bushing 56. In operation they are thus firmly connected to the bearing supporting tube 18. The coils 62, 63 are in turn firmly secured to plates 57, 58, e.g. by an adhesive, and form together therewith a uniform stable structure.

Figures 3, 5, 6:
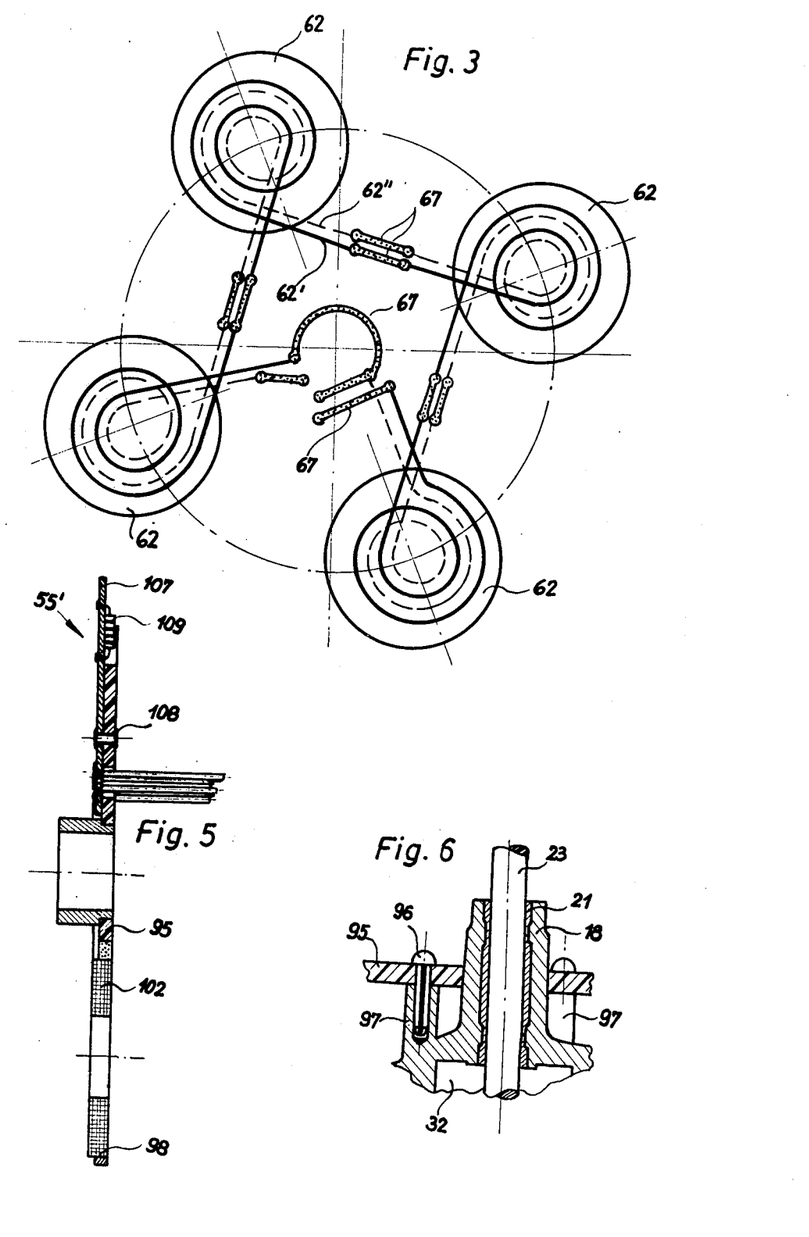
FIG. 3 is a circuit diagram schematically showing the circuit and the winding direction for the upper layer of the stator winding of FIG. 1.
FIG. 5 is a section along the line 5—5 of FIG. 4.
FIG. 6 is a detail of the attachment of the stator plate according to FIG. 5 in section along the line 6—6 of FIG. 4.
Figure 17:
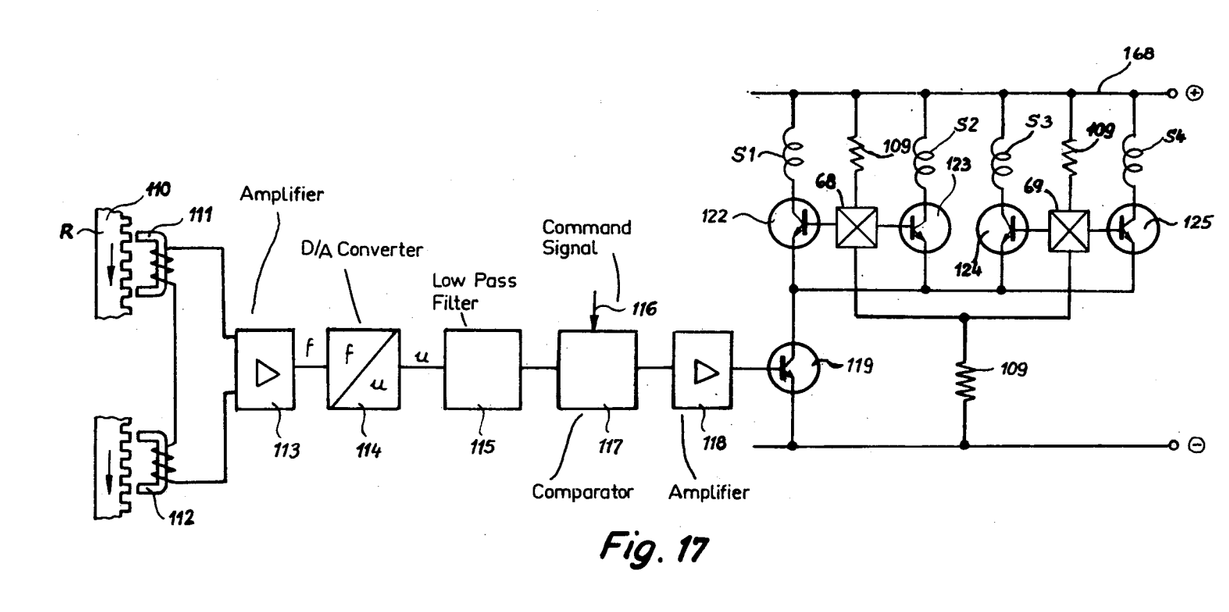
FIG. 17 is a schematic view of a control circuit for a brushless d-c motor according to the invention.

The coils of one layer are in each case connected in series with the same winding direction as shown in FIG. 3 relative to the example of coil 62, one wire 62' of the bifilar winding being shown by a continuous line and the other wire 62" being shown by a dotted line. Printed conductors 67 which are provided on plates 57, 58 in a conventional manner are used for connection purposes. Coils 62, 63 require only three terminals. As seen in FIG. 17, all the phase windings S1 to S4 have one terminal connected to a positive terminal 168 of a d-c source (not shown).

As shown in FIG. 2, a Hall generator 68 is secured to plate 58; displaced by 90° electrical relative thereto a second Hall generator 69 is provided on the lower plate 57. In conventional manner, these Hall generators are used for controlling the commutation of the current between the individual phase windings. The four series-connected upper round coils 62 form two phase windings, and the four series-connected round coils 63 of the lower layer form two further phase windings. FIG. 17 shows the conventional circuitry for the Hall devices 68, 69.

Figure 8:
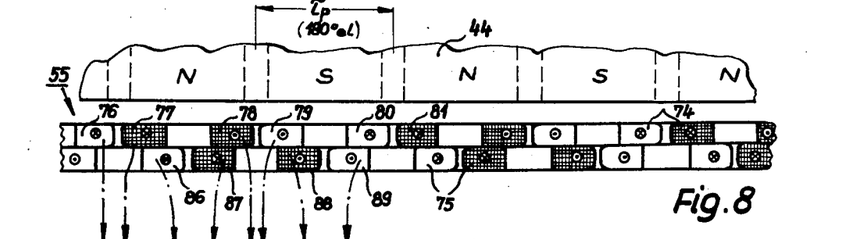
FIG. 8 is a schematic developed fragmentary of a prior art motor.

The coil arrangement according to FIGS. 1 and 2 is explained with reference to FIGS. 8 and 9. FIG. 8 shows the development of the motor construction according to U.S. Pat. No. 3,845,339 with ring magnet 44 and stator 55 which in that case has two coils per pole, specifically coil 74 in the upper layer and coil 75 in the lower layer. The width of these coils is not quite a pole pitch, i.e. about 180° electrical. Here, too, the coils of both the upper layer and the lower layer each are connected in series but with alternating winding directions, so that different current directions occur in the magnetically active coil portions indicated symbolically by crosses and dots; in conventional manner a cross represents a current flowing into the plane of the drawing and a point a current flowing out the plane of the drawing. In the upper layer of FIG. 8, for example, starting at the left there are first two adjacent coil sections 76, 77, wherein in each case the current flows into the plane of the drawing, followed by two adjacent coil sections 78, 79 where the current flows out of the plane of the drawing and this is reversed in the next pair of coil sections 80, 81 and so on.

Figure 9:
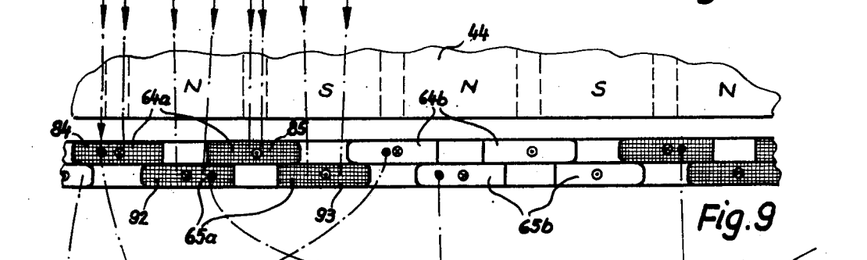
FIGS. 9 and 10 are two schematic developed fragmentary views for explaining the principles of the present invention, to the same scale as FIG. 8.

According to the invention, and as illustrated in FIG. 9, coil sections 76, 77 are combined into a single correspondingly larger coil section 84 with the same current direction as are coil sections 78, 79 to a correspondingly larger coil section 85 of the same current direction. The same happens with corresponding coil sections of the lower layer of FIG. 8, so that in the arrangement according to FIG. 9, in place of the original two coil sections, there is now only a single coil section; e.g. coil sections 86, 87, 88, 89 of FIG. 8 are replaced by coil sections 92, 93 in FIG. 9. Actually, the coil sections in FIG. 9 can be connected in random manner, e.g. as shown to form round coils with an average diameter of approximately 360° electrical.

As the arrangement according to FIG. 9 is substantially the electrical equivalent to that of FIG. 8, it is possible, without difficulty to use the circuit according to application Ser. No. 402,259, now U.S. Pat. No. 3,924,166, Doeman, therewith.

Figure 4:
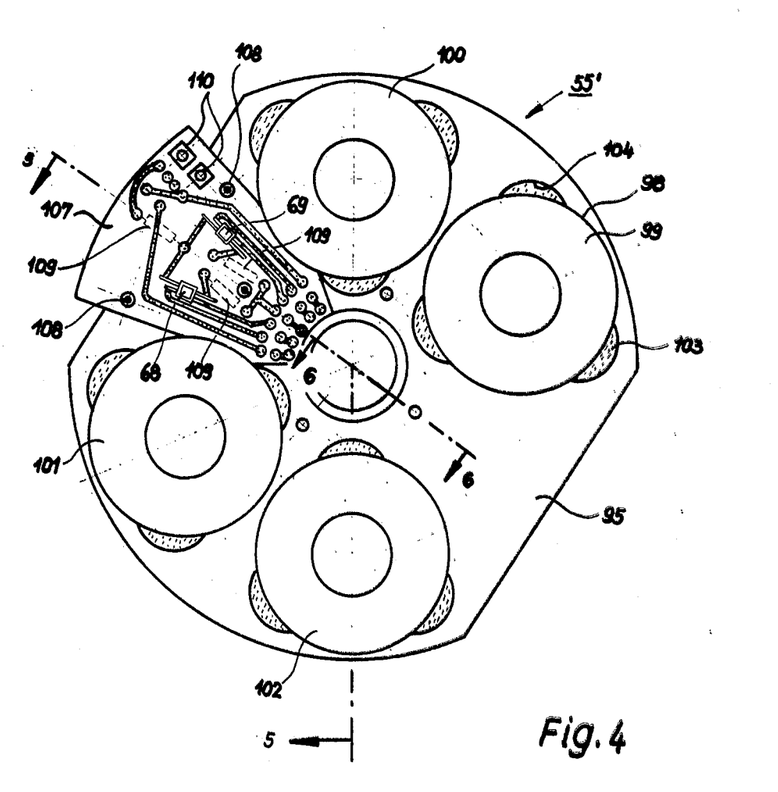
FIG. 4 is a second embodiment of a stator winding for the motor of FIG. 1.
Figure 7:
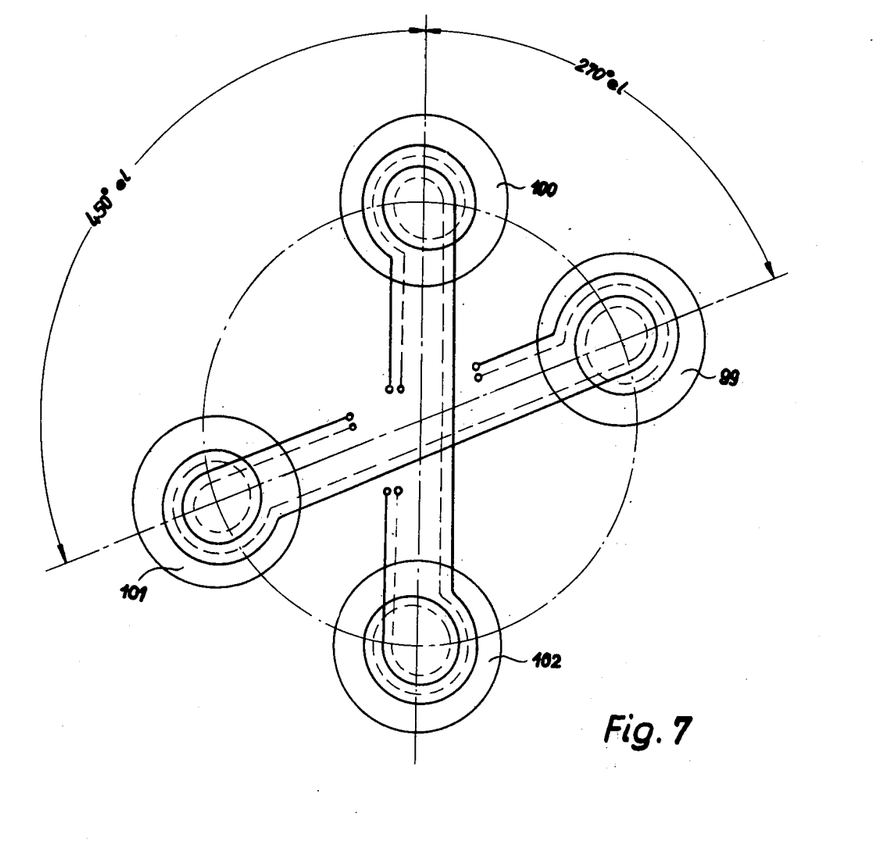
FIG. 7 is a circuit diagram showing schematically the circuit and winding direction of the 4 coils of the stator arrangement according to FIG. 4.

For specific numbers of poles, the coil arrangement according to FIG. 2 or FIG. 9 can be further simplified. FIGS. 4 and 5 show this relative to the example of a stator arrangement 55' for the 8-pole motor of FIG. 1. This arrangement 55' has a relatively thick insulating plate 95 which according to FIG. 6 can be fixed in advantageous manner by means of ribbed nails 96 to protuberances 97, the latter being arranged around the bearing supporting tube 18. Plate 95 has four recesses 98 for receiving four round coils 99, 100, 101 and 102 which are secured in the said recesses by means of a sealing compound 103, for which purpose lateral half-moon-shaped recesses 104 are used wherein the sealing compound is secured. As shown in FIG. 7, all four coils are wound in bifilar manner and in each case the diametrically opposing coils are unidirectionally connected in series, i.e. 99 with 101, and 100 with 102, so that once again four phase windings are obtained.

FIGS. 4 and 5 also show that a printed circuit board 107 is riveted by means of rivets 108 to plate 95. It carries the two Hall generators 68 and 69 which are displaced by 90°-el. relative to one another, as well as resistors 109 and other electrical components 110. This printed circuit board forms a small circuit to which only seven connecting leads are connected, which represents a considerable simplification. The assembly of printed circuit board 107 to stator plate 95 is made possible by the large gap between coils 100 and 101, which according to FIG. 7 is 450°-el. or 112.5° mechanical.

Figure 10:
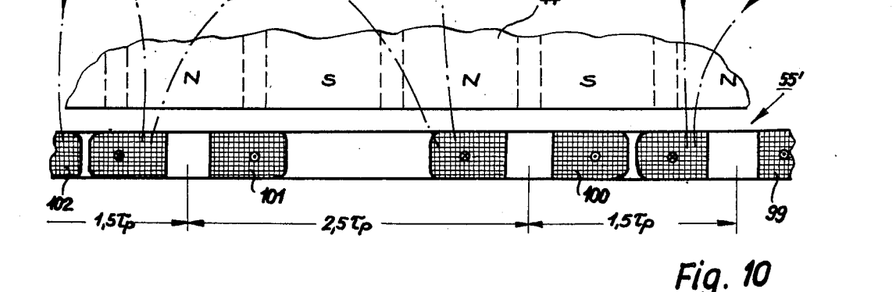
Figure 11:
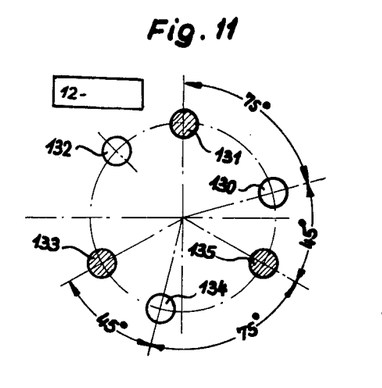
FIG. 11 is a schematic view of a winding according to the invention for a 12-pole motor.

FIG. 10 explains the coil arrangement according to FIGS. 4, 5 and 7. As can be seen in FIG. 9, the coils 64a and 64b have in each case the same position relative to the poles of rotor magnet 44. Thus, for example, coil 64b can be omitted and instead coil 64a can be given twice as many turns so that, for example, coil 101 in FIG. 10 is obtained. In the same way, the two coils 65a and 65b of the lower layer of FIG. 9 can be combined to form coil 100 of FIG. 10 and the same applies analogously for coils 99 and 102 in FIG. 10. As a result of skillful combination, a coil arrangement is obtained which can be placed in a single layer which is obviously very advantageous from the manufacturing standpoint and also permits the incorporation of printed circuit board 107.

In general, respective $m$-th and $(m+2)$th magnetically active coil sections are combined to form a single coil, as is clearly apparent from comparing the arrangement in FIGS. 9 and 10. To obtain appropriate power output, the coil sections which are combined, that is, formed by a single coil, such as coils 99, 100, 101, 102, per pole, have approximately $n$ times the number of ampere turns of the equivalent set of overlapping individual coils (as explained in connection with FIG. 9) and which are displaced by 90°-el. to provide the rotating rotor field. These single coils are arranged in non-overlapping location to provide for the single layer winding — see FIG. 10. The usual number for $n = 2$, since usually two overlapping coils are combined.

A control circuit according to FIG. 17 is particularly suitable for a stator arrangement according to FIGS. 4, 5 and 7. In FIG. 17, rotor R is provided with teeth 110 sensed by two series-connected sensors 111, 112 displaced relative to one another by 180° mechanical and arranged on the stator, so that a speed-proportional frequency is obtained, e.g. 400 pulses per revolution. This frequency $f$ is amplified in an amplifier 113, converted into an actual speed voltage signal $u$ in a digital-analog converter 114, smoothed in a low-pass filter 115 and compared with a desired or command value supplied via a line 116 in a computer 117. The output signal of comparator 117 is amplified in an amplifier 118 and controls the motor current via an npn transistor 119 series-connected with the four phase windings S1 to S4 of the stator. In conventional manner, the outputs of Hall generators 68 and 69 control four npn transistors 122, 123, 124, 125, each of which controls the current in the phase winding associated therewith. With the coil arrangement according to FIGS. 4, 5 and 7, such a regulator can easily regulate the speed of a low speed brushless d-c motor, e.g. accurately to 33⅓ r.p.m.

Obviously, the invention is not restricted to 8-pole motors, although this number of poles represents a certain optimum because the coils are still not too small and the magnetization of rotor magnet 44 represents no difficulties.

FIGS. 11 to 16 show stator arrangements for different numbers of poles, in each case the series-connected coils are characterized in the same way. For example, a stator according to the invention for a 12-pole motor has six coils 130, 131, 132, 133, 134, 135 which are in each case wound in bifilar manner; the shaded coils 131, 133 and 135 are unidirectionally interconnected in series and form the first two phase windings of the motor, and the unshaded coils 130, 132 and 134 which are also series-connected form the other two phase windings. If two Hall generators displaced by 90°-el. relative to one another are placed on the stator in the correct angular position, the control circuit of FIG. 7 can be used once again. This also applies to the stator arrangements according to FIGS. 13 to 16. In FIGS. 11 to 16 the distances between the individual coils are given in mechanical degrees.

Figure 12:
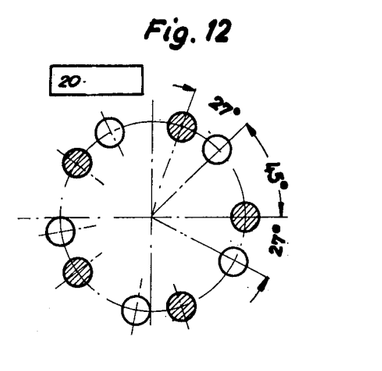
FIG. 12 is a schematic view of a winding according to the invention for a 20-pole motor.

FIG. 12 shows a stator for a 20-pole motor which has 10 coils.

Figure 13:
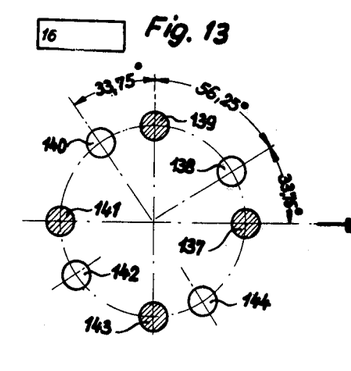
FIGS. 13 and 14 are schematic views of two variants of a winding according to the invention for a 16-pole motor.
Figure 14:
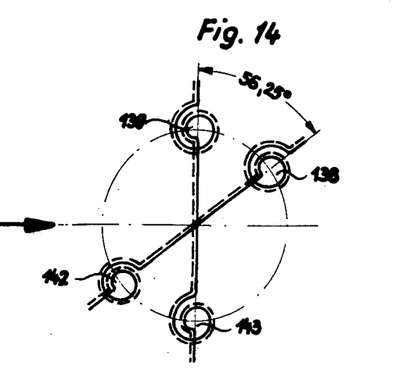

FIG. 13 shows a stator for a 16-pole motor with eight coils 137–144. The arrangement can be simplified by omitting some of the symmetrically positioned coils, e.g. coils 137, 141, 140, 144, and the arrangement according to FIG. 14 is then obtained, which is extremely simple. On further simplifying in this way the arrangement of FIG. 4, only two juxtaposed coils would be obtained and this arrangement would be perfectly usable in special cases.

Figure 15:
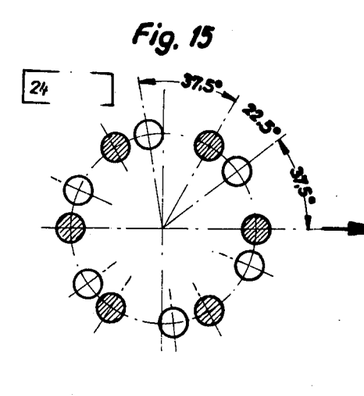
FIGS. 15 and 16 are schematic views of two variants of a winding according to the invention for a 24-pole motor.
Figure 16:
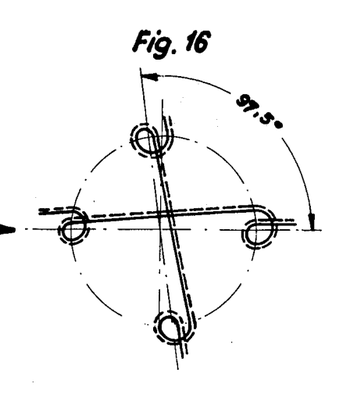

FIG. 15 shows a stator for a 24-pole motor and FIG. 16 a further simplified variant with only four coils. Thus, the number of poles which can be integrally divided by eight leads to particularly simple stator arrangements according to the present invention.

It is naturally possible, e.g. in the case of the arrangement according to FIG. 15, to omit only half the coils and then double the number of turns on the other coils. It is naturally also possible in the case of FIGS. 14 and 16 to select others of the remaining coils, e.g. the arrangement of FIG. 14 may use coils 140, 141 and 137, 144 of FIG. 13 instead of 138, 139 and 142, 143.

If (as known), the individual motor windings are controlled in such a way that current can flow through the individual windings in both directions, e.g. if the windings are controlled by a bridge circuit, then it is possible to use unifilar coils in place of bifilar coils in all cases. The invention may be used in the same way. A bifilar coil can of course be replaced by two unifilar coils arranged adjacent each other and "bifilar" is meant to include this physical arrangement. It should be pointed out, however, that bifilar coils, i.e. coils having substantially parallel-wound wires, usually can be made more conveniently; their electrical properties are almost identical, which is usually desirable.

As seen specifically in FIGS. 7, 14 and 16, imaginary lines passing through the diametrically opposite coils of a pair form alternatingly angles with respect to each other which are unequal. The inequality can be determined from a consideration of FIGS. 9, 10, and 7, 14 and 16, respectively. Expressed in electrical degrees, the sum of the angles, in electrical degrees, must be $k \cdot 360$, in which $k$ is a whole number of at least unity; the angles between the coils themselves must be whole multiples of 90°-el.

Various changes and modifications may be made, and features described in connection with any one of the embodiments may be used with any of the others within the scope of the inventive concept.

Since the few coils used in a one layer winding, e.g. the winding according to FIG. 7, or any of FIGS. 11 to 16, due to their large copper volume are quite rigid and sturdy, they can be clamped at an outer or inner portion thereof to a part of the motor structure, e.g. by flanges as taught in German Pat. No. 843,866, FIGS. 1 and 2, whilst the non-clamped portions thereof extend freely — in cantilever fashion — into the airgap of the rotor without additional support. This obviates the need for additional support structure, e.g. the support plate 95 shown in FIG. 4, and makes possible an extremely simple motor structure both for motors having a coreless flat winding or for motors having a coreless cylindrical winding.

What is claimed is:

1. A slow speed brushless speed controlled d-c motor having a coreless stator winding and a rotary multipolar permanent magnet rotor which in operation interacts with a rotary field produced by the coreless stator winding, and a sensor arrangement controlled by the rotary position of the rotor connected to control current flow through the stator winding;

wherein the stator winding has a maximum of two magnetically active coil sections per pole of the multipolar rotor two coil sections forming a set;

the coil sections are located in two superposed layers;

and a number of coil sections (62) corresponding to the number of pairs of poles are interconnected and symmetrically distributed in one layer and the same number of coil sections (63) are symmetrically distributed in the second layer of the two layer winding, the coil sections of the second layer being displaced by an angle ($\alpha$) relative to the coils of the first layer;

wherein the displacement angle ($\alpha$) is an odd multiple of 90°-el and the maximum width of the coils is about 360°-el;

means deriving a control signal representative of speed of rotation of the rotor;

and means controlling current flow through said stator coil sections in dependence on said control signal.

2. Motor according to claim 1, wherein the displacement angle ($\alpha$) is 90° electrical.

3. Motor according to claim 2, wherein the coil sections in one plane are connected in series.

4. Motor according to claim 2, wherein the coil sections in one plane are wound in bifilar manner (62', 62") and are connected in series.

5. Motor according to claim 2, wherein the coil sections in one plane are unidirectionally connected in series so that, when current flows through them, they produce magnetic fields having the same direction.

6. Motor according to claim 1, wherein the motor is an axial airgap motor;

and the coil sections are constructed as flat circular coils (62, 63).

7. Motor according to claim 1, wherein the motor is an eight-pole motor;

and two diametrically opposite interconnected coil sections form an interconnected set.

8. Motor according to claim 7, wherein the coil sections are located on the motor such that imaginary lines passing through the diametrically opposite coil sections of the sets form an angle with each other of 90°-el. or an odd multiple thereof.

9. Motor according to claim 7, wherein the coil sections are located on the motor such that imaginary lines passing through the diametrically opposite coils of the pairs of coils form an angle of 450°-el. and 270°-el. respectively and wherein the sensor arrangement (68, 69, 107) for determining the rotary position of the rotor (44) is located between the coils including the larger angular range of 450°-el.

10. Motor according to claim 1, wherein the coil sections form a single winding;

and the means controlling current flow through said coil sections control the current to flow therethrough, alternately, in opposite directions to produce magnetic fields having, sequentially, opposite direction of flux.

11. A brushless d-c motor having a coreless stator winding and a rotary multipolar permanent magnet rotor which in operation interacts with a rotary field produced by the coreless stator winding, and a sensor arrangement controlled by the rotary position of the rotor connected to control current flow through the stator winding;

wherein the stator winding has a maximum of two magnetically active coil sections per pole of the multipolar rotor, for each $m$ coil, a magnetically active $m$ coil section and a magnetically active $m + 1$ coil section per pole are provided, and the successive coil sections are displaced relative to one another by the same angle;

respective $m$-th and $(m+)$th magnetically active coil sections are combined to form a single coil;

and wherein the coil sections are formed by a single coil (99, 100, 101, 102; 138, 139, 142, 143) per pole, of approximately $n$ times the number of ampere turns of an equivalent set of overlapping individual $m$ coils displaced by 90°-el. to provide said rotary field, said single coils being arranged in non-overlapping manner to obtain a single layer winding.

12. Motor according to claim 11, wherein the motor is an axial air gap motor;

and the coil sections are constructed as flat circular coils (62, 63).

13. Motor according to claim 11, wherein the motor is an eight-pole motor;

and two diametrically opposite interconnected coil sections form an interconnected set.

14. Motor according to claim 11, wherein the permanent magnet rotor has a number of poles integrally divisible by 4.

15. Motor according to claim 11, wherein the placement of said single coils and their number of ampere turns is symmetrical relative to the motor axis of rotation.

16. Motor according to claim 15, wherein the motor has a number of poles of at least 8; and wherein n = 2.

17. Motor according to claim 16, wherein (FIG. 4) the motor is an 8-pole motor, four bifilar coils are provided, two pairs of coils (99, 101; 100, 102) each are unidirectionally connected in series and two coils of each pair of coils are located diametrically opposite each other with respect to the axis of rotation of the motor.

18. Motor according to claim 17, wherein the coils are located on the motor such that imaginary lines passing through the diametrically opposite coils of the pairs of coils form an angle of 450°-el. and 270°-el. respectively and wherein the sensor arrangement (68, 69, 107) for determining the rotary position of the rotor (44) is located between the coils including the larger angular range of 450°-el.

19. Motor according to claim 15, wherein (FIG. 14) the motor is a 16-pole motor and wherein n is equal to or less than four.

20. Motor according to claim 15, wherein (FIG. 14) the motor is a 16-pole motor, four coils (138, 139, 142, 143) are provided, two pairs of coils each are connected in series and two coils of each pair of coils are located diametrically opposite each other with respect to the axis of rotation of the motor.

21. Motor according to claim 20, wherein the coils are located on the motor such that imaginary lines passing through the diametrically opposite coils of the pairs of coils form an angle of 450°-el. or less.

22. Motor according to claim 15, wherein (FIG. 16) the motor is a 24-pole motor and wherein n is equal to or less than 5.

23. Motor according to claim 15, wherein (FIG. 16) the motor is a 24-pole motor, four coils are provided, two pairs of coils each are connected in series, and two coils of each pair of coils are located diametrically opposite each other with respect to the axis of rotation of the motor.

24. Motor according to claim 20, wherein the coils are located on the motor such that imaginary lines passing through the diametrically opposite coils of the pairs of coils form an angle of about 97.5° mechanical.

25. Motor according to claim 11, wherein the motor is a flat, axial air gap motor and the coils are shaped as flat, circular coils.

26. Motor according to claim 11, in combination with a speed control circuit; and transducer means provided supplying an actual speed pulse value signal having a pulse count per rotor rotation which is high relative to the motor speed.

27. Motor according to claim 11, wherein the motor is a slow speed motor adapted for direct drive of phonograph reproducing apparatus, further including speed control means deriving a control signal representative of speed of rotation of the rotor; and means controlling current flow through said coil sections in dependence on said control signal.

28. Motor according to claim 11, in combination with a speed control circuit; and transducer means supplying an actual speed pulse signal having a pulse count per rotor rotation which is high relative to the motor speed.

29. Motor according to claim 11, wherein the motor is an axial air gap motor.

30. Motor according to claim 11, wherein the coil sections form a single winding; and the means controlling current flow through said coil sections control the current to flow therethrough, alternately, in opposite directions to produce magnetic fields having, sequentially, opposite direction of flux.

31. Axial air gap motor comprising a permanent magent rotor (54) having alternate zones of magnetization forming magnet poles;
a coreless stator winding comprising at least four coils (99-102);
transducer means interacting with the magnetic field of the rotor to provide a rotor position signal;
and circuit means selectively energizing the coils to provide a rotary field for interaction with the rotor poles,
wherein
the coils are flat coils in which two coils, each form a pair located opposite each other with respect to the axis of rotation of the rotor;
oppositely located coils of one pair are connected in series and unidirectionally wound to provide for current flow therethrough in the same direction;
and the coils are distributed non-uniformly circumferentially with respect to said axis of rotation such that imaginary lines passing through the opposite coils of a pair form alternatingly electrical angles with respect to each other which are odd whole number multiples of 90° -el.

32. Motor according to claim 31, wherein the permanent magnet rotor has a number of poles integrally divisible by 4.

33. Motor according to claim 31, wherein the motor is an eight-pole motor, four coils are provided and the coils are spaced by angles of 270°-el. and 450°-el., respectively.

34. Motor according to claim 31, wherein the rotor has a number of poles integrally divisible by eight, at least four coils are provided, arranged in coil pairs and spaced mechanically, approximately circumferentially with respect to the axis of rotation of the rotor to interact with the magnetic field of the permanent magnet rotor as determined by the relationship:

| Motor poles | Large angle | Small angle |
| --- | --- | --- |
| 8 | 112.5° | 67.5° |
| 16 | 123.75° | 56.25° |
| 24 | 97.5° | 82.5° | wherein the "large angle" and "small angle" columns respectively relate to the mechanical angles between said imaginary diametrical lines, the circumferentially non-uniform placement of said coils resulting in alternately larger and smaller included angles therebetween.

35. Motor according to claim 31, wherein the transducer means are arranged on a carrier plate (107) arranged between two adjacent flat coils.

36. Motor according to claim 31, wherein the coils are constructed as circular coils (62, 63).

37. Motor according to claim 31, wherein the coils are located diametrically opposite each other with respect to the axis of rotation of the rotor.

38. Motor according to claim 24, wherein the transducer means and at least part of the energization circuit means are located in the space between the coils spaced circumferentially from each other by the greater one of said angles.

39. Motor according to claim 33, wherein the sensor arrangement (68, 69, 107) for determining the rotary position of the rotor (44) is located between the coils including the larger angular range of 450°-el.

40. Motor according to claim 31, wherein the motor is a slow speed motor adapted for direct drive of
  phonograph reproducing apparatus, further including speed control means deriving a control signal representative of speed of rotation of the rotor;
  and means controlling current flow through said coil sections in dependence on said control signal.

41. Motor according to claim 31, in combination with a speed control circuit; and transducer means supplying an actual speed pulse signal having a pulse counter per rotor rotation which is high relative to the motor speed.

42. Electric motor comprising a permanent magnet rotor (54) having alternate zones of magnetization forming magnet poles;
  a coreless stator winding comprising at least four thin coils (99–103);
  transducer means interacting with the magnetic field of the rotor to provide a rotor position signal;
  and circuit means selectively energizing the coils to provide a rotary field for interaction with the rotor poles,
  wherein
  the coils are thin flat coils in which two coils, each, form a pair located opposite each other with respect to the axis of rotation of the rotor and wherein oppositely located coils are connected in series to provide for current flow therethrough in the same direction;
  and the coils are distributed non-uniformly circumferentially with respect to said axis of rotation such that imaginary lines passing centrally through opposite coils of a pair form alternatingly electrical angles with respect to each other which are odd whole number multiples of 90°-el.

43. Motor according to claim 42, wherein the coils are bifilar coils.

44. Motor according to claim 42, wherein the permanent magnet rotor has a number of poles integrally divisible by 4.

45. Motor according to claim 42, wherein the motor is an eight-pole motor, four coils are provided and the coils are spaced by angles of 270°-el. and 450°-el., respectively.

46. Motor according to claim 42, wherein said motor is an axial air gap motor.

47. Brushless d-c motor having a coreless permanent magnet rotor;
  and a stator coil arrangement having two sets of coil sections (a, b) forming a single layer winding to generate a rotary field on the rotor,
  wherein the coil sections of any set being symmetrically placed along the circumference of the rotor, one set being offset with respect to the other by $(2k + 1) \times 90°$-el., wherein $k = 0, 1, 2, 3, 4 \ldots n;$
  at least two coil sections form a set and these coil sections are serially connected and unidirectionally wound with respect to each other, and spaced along the circumference by whole multiples of 360°-el.

48. Motor according to claim 47, wherein the coil sections in one plane are wound in bifilar manner (62', 62") and are connected in series.

49. Motor according to claim 47, wherein the coil sections form a single winding;
  and means are provided controlling current flow through said coil sections, alternately, in opposite direction.

50. Motor according to claim 47, wherein the motor is a slow speed motor adapted for direct drive of phonograph reproducing apparatus, further including speed control means deriving a control signal representative of speed of rotation of the rotor;
  and means controlling current flow through said coil sections in dependence on said control signal.

51. Motor according to claim 47, in combination with a speed control circuit; and transducer means supplying an actual speed pulse signal having a pulse count per rotor rotation which is high relative to the motor speed.

52. Motor according to claim 47 wherein said motor is an axial air gap motor.

* * * * *